United States Patent
Rehm et al.

(10) Patent No.: US 8,051,152 B2
(45) Date of Patent: Nov. 1, 2011

(54) ISOLATED APPLICATION SERVER

(75) Inventors: Werner Rehm, Heidelberg (DE);
Thomas Becker, Mannheim (DE);
Guenter Zachmann, Rauenberg (DE);
Masoud Aghadavoodi Jolfaei, Wiesloch (DE); Edgar Willi Lott, Baden-Württemberg (DE)

(73) Assignee: SAP AG, Walldorf (DE)

( * ) Notice: Subject to any disclaimer, the term of this patent is extended or adjusted under 35 U.S.C. 154(b) by 341 days.

(21) Appl. No.: 12/334,133

(22) Filed: Dec. 12, 2008

(65) Prior Publication Data

US 2010/0153524 A1    Jun. 17, 2010

(51) Int. Cl.
*G06F 15/177* (2006.01)
*G06F 15/173* (2006.01)
*G06F 11/00* (2006.01)

(52) U.S. Cl. ............ 709/221; 709/226; 714/E11.207

(58) Field of Classification Search .......... 709/217–219, 709/220–222, 223–226
See application file for complete search history.

(56) References Cited

U.S. PATENT DOCUMENTS

| | | | |
|---|---|---|---|
| 7,325,046 B1 * | 1/2008 | Novaes et al. | 709/220 |
| 2007/0130341 A1 * | 6/2007 | Ma | 709/226 |
| 2009/0198805 A1 * | 8/2009 | Ben-Shaul et al. | 709/222 |

* cited by examiner

*Primary Examiner* — Peling Shaw
(74) *Attorney, Agent, or Firm* — Blakely, Sokoloff, Taylor & Zafman

(57) ABSTRACT

Dynamically isolating application servers, wherein only active application servers are indicated to client applications to prevent access to inactive application servers by the client applications. A central server of a distributed system determines a state of application servers in a system, and generates a list of application servers that includes all application servers of the system including an indication of the state of the application servers. The central server also generates a filtered list of application servers that excludes inactive application servers or application servers in an inactive mode. The filtered list is passed to client applications, which enables the client applications to only access the active application servers, but not access the inactive application servers.

19 Claims, 4 Drawing Sheets

ISOLATED APPLICATION SERVER

FIELD

Embodiments of the invention are related generally to distributed computing systems, and more particularly to isolating application servers in a distributed system.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2008, SAP AG, All Rights Reserved.

BACKGROUND

A distributed system is a system in which multiple servers may be spread through multiple systems or subsystems. Each system may include multiple application servers. An example is the Netweaver system available from SAP AG of Walldorf, Germany. The application servers receive and process requests from client applications that may be both within and external to the system. In traditional systems, even when an application server is disabled from receiving requests from external applications, the system itself is aware of the application server, and can send requests to the application server. Thus, an application server cannot traditionally be a part of a system without being seen by the system and hit with requests.

Hitting the application server with requests when trying, for example, to perform testing within the system can reduce the effectiveness of the testing and/or increase the testing time. Additionally, errors may be introduced into the testing even when the application server intended for testing should not be available to service external requests. Hitting the application server can also result in data loss within the system if the application server fails to perform the processing. Thus, current systems cannot have an application server that is part of the system context, and yet isolated from servicing requests.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
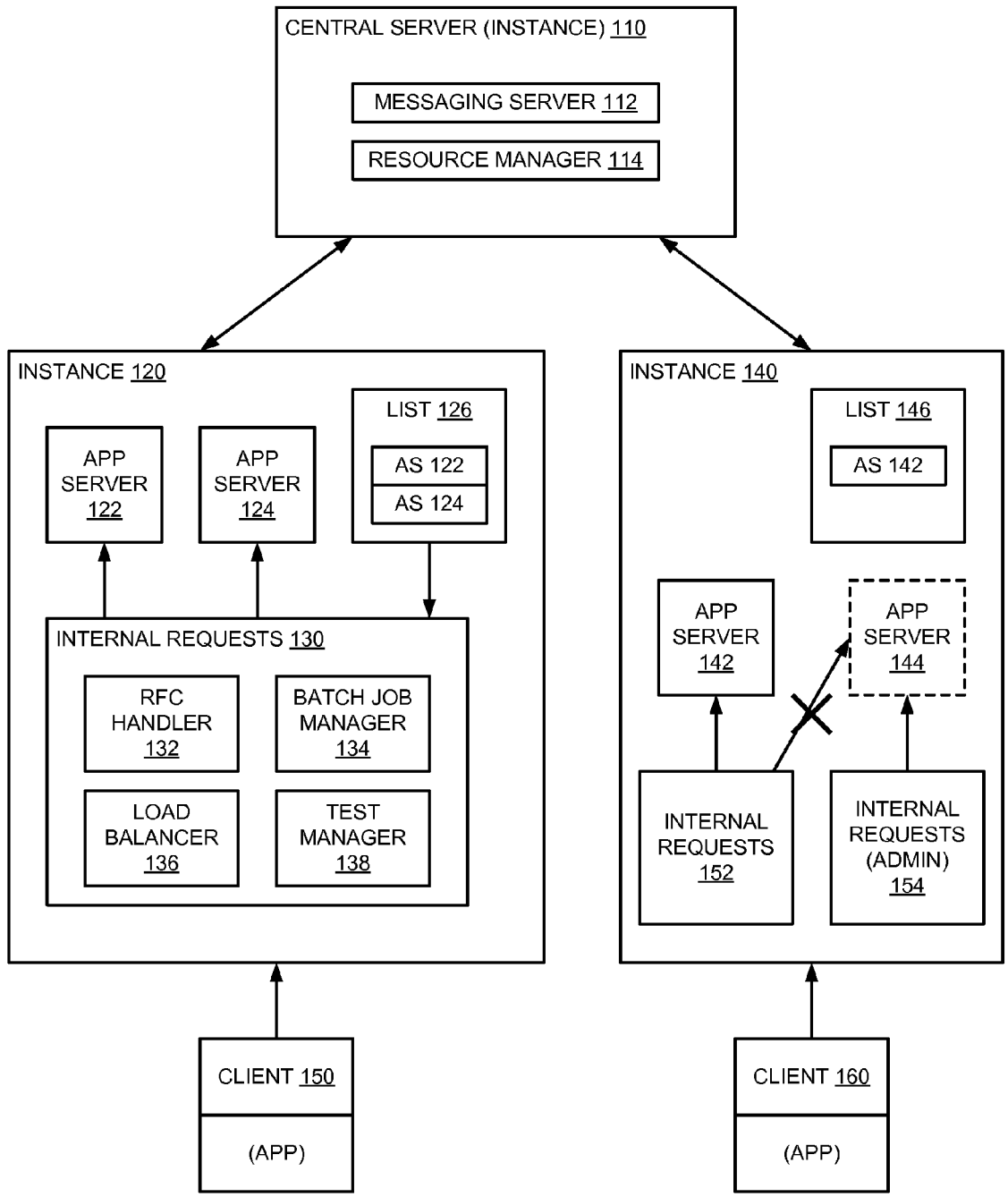
FIG. 1 is a block diagram of an embodiment of a distributed system having an isolated application server.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, an application server operates in an isolated mode. The application server can exist and execute within the context of the system, and yet be unavailable for processing requests, whether internal or external requests. The external requests come from clients of the system that are external to the system. The internal requests are made by applications or client applications within the system itself. Examples of applications that make internal requests are batch jobs and load balancing modules. A system can determine a state of all application servers within the system, and generate lists of application servers based on the state of the application servers. A full list may indicate all application servers, even those in an inactive or isolated state. A filtered or reduced list may indicate only those that are technically available, and can be accessed by applications within or outside of the system. When a request for system resources is made on the system, the filtered list is provided to indicate what application servers are available as system resources. The presenting of the filtered list prevents isolated application servers of the system from being available for processing requests, and makes available only those application servers that are currently active.

In one embodiment, when an application server is activated within the system, it accesses a central server of the distributed system, and indicates its existence within the system. The application server may be initiated in an inactive state, which is indicated to the system. Alternatively, the application server may be initiated in an active state, and later, dynamically deactivated. The central server may determine the state of the application servers and generate one or more lists of the application servers. In one embodiment, one list indicates only active servers, which list is passed to applications requesting resources of the system. In one embodiment, a full list is generated that indicates all application servers within the system, and indicates a status of each application server. In one embodiment, a list of all isolated or inactive servers is generated, which may indicate all servers not listed in the active application servers list.

An inactive or isolated server may still be accessible if an application or client is aware of the application server and can refer to it directly (e.g., via identifier or address). In one embodiment, even calling the application server directly is not sufficient to provide requests to the application server, which may require certain permissions, passwords, etc. Multiple use cases can be accomplished by allowing access to the application servers in inactive mode. For example, an application server may be in a testing mode that tests functionality of the application server within the context of the system in which the application server executes. An example of testing may include installing a new kernel in an application server and testing its functionality within the system. Another mode is a maintenance mode, which can, for example, run analysis on the application server within the context of the system, or install upgrades on individual or groups of application servers without having to take down the system.

In one embodiment, an application server can be selectively activated and inactivated within a system, for example, to dynamically change the configuration of the system. There is generally significant overhead in bringing up and shutting down an application server. Frequently, shutting down an application results in abrupt stops to request processing, which may result in the loss of data. However, if application servers are placed in an inactive state, they may be isolated from new requests, and could finish processing old requests/tasks until idle, at which time they may be removed from the system. The application servers could be retained as inactive application servers until needed again (in a demand-based implementation), or until it is time to activate the application servers (in a time-based implementation).

In one embodiment, one or more application servers may be part of two separate and distinct systems within the distributed system. The application servers may be switched between the systems based on need, or based on a schedule of when to switch the application servers (e.g., timed-switching based, for example, on expectations or historical observations).

FIG. 1 is a block diagram of an embodiment of a distributed system having an isolated application server. System 100 is an example of a distributed system that can have multiple subsystems or systems within it, such as instances 120 and 140. Central server (instance) 110 may be a central server that can perform certain operations common to all instances or systems within distributed system 100.

Central server 110 includes various services or servers to perform operations for instances 120 and 140. Specific services that may be provided by central server 110 include messaging services by messaging server 112. In one embodiment, messaging server 112 receives an indication from each application server that is initiated with distributed system 100. For example, each application server may register with messaging server 112 to enable inter-system communications, and configure communications with clients. Resource manager 114 represents one or more components of central server 110 that may generate lists of application servers, indicating the mode or state or status of each application server. In one embodiment, resource manager 114 includes methods or interfaces (e.g., APIs (application programming interfaces)) that allow administrative access to application servers. For example, administrative access may allow dynamically changing the state of an application server. In one embodiment, application servers are polled or requested for their status, which may be performed by resource manager 114.

Central server 110 is communicatively connected to instance 120 and instance 140 of distributed system 100. Each instance may include one or more application servers, which may each include various server nodes that provide services to clients and client applications that request processing resources or request services. Simply for purposes of convenience and simplicity of discussion, two application servers are illustrated in each of instances 120 and 140, which are application servers 122 and 124, and 142 and 144, respectively. It will be appreciated that the selection of showing two application servers is solely for purposes of illustration, and fewer or, commonly, more application servers may be present in a system.

Instance 120 includes list 126, which indicates both application servers 122 and 124, by reference number. Thus, list 126 indicates all application servers of instance 120 (referred to as AS 122 and AS 124), because they are both active. In contrast, instance 140 includes list 146, which only indicates application server (AS) 142. Within instance 140, application server 142 is active, and is available for all applications within instance 140, as well as to client 160 and other clients (not shown) that may be connected with instance 140. Application server 144 is an isolated application server, which is not available generally within instance 140, and so should not be presented for either internal or external requests.

In one embodiment, list 126 is presented to all internal requests 130 of instance 120. Thus, applications or processes that may generate internal requests, such as RFC handler 132, batch job manager 134, load balancer 136, and test manager 138 receive indication that application servers 122 and 124 are available with instance 120. Even preventing client 150 and any associated applications from accessing the application servers would not necessarily prevent the internal requests 130 from sending requests to the application servers.

It will be understood that internal requests 130 are not intended to represent a complete list of all applications or processes that could generate requests of application servers from within instance 120. Rather, internal requests 130 merely provide some examples that may be present. Not all are required to be present in every implementation. Other applications or processes may be present in certain implementations. RFC (remote function call) handler 132 generally represents one or more components that enable hitting an application server with a direct request from an external system (e.g., such as a request from application server 142 of instance 140). Batch job manager 134 generally represents batch jobs or automated processes that may be executed within instance 120. Load balancer 136 refers generally to any mechanism or component that may be involved in distributing requests to one application server or another based on current workloads of each application server. Thus, a particular request may be sent to one application server or another based on how busy each application server is (e.g., how "loaded" the application server are).

As illustrated for instance 140, application server 144 is isolated, which means that internal requests 152 (which may include the same elements as internal requests 130, or have different and/or additional elements not shown) cannot access application server 144. Reference to internal requests 152 not being able to access the application server assumes that internal requests are not aware of application server 144 and/or do not have permission to access the isolated application server. In one embodiment, application server 144 is not exposed to or made known to internal requests 152, which then cannot send requests to the application server, given they are unaware of its presence and are unable to address the application server.

However, in one embodiment, internal requests (administrative) 154 may have both rights and ability to access application server 144. For example, administrative internal requests 154 may be aware of application server 144 based on receiving a full list (e.g., a different list than list 146) of application servers. Other internal requests could also be made aware of an isolated application server, and could potentially be given rights to access the application server. Such an internal request may be an application intended to work with the isolated application server to provide a particular function on the application server while it is inactive within the system. However, for purposes of description, all internal requests that are able to access the isolated application server will be referred to as "administrative," meaning administrative internal requests 154 may generically represent any type of application or process that accesses the isolated application server for any purpose. Such purposes may include testing, maintenance, etc., which are mentioned above, and described in more detail below with respect to FIGS. 3 and 4.

In one embodiment, application server 144 is originally active and accessible to internal requests 152, but is made inactive. Similarly, an inactive application server could be made active. In one embodiment, the execution of internal requests 152 is maintained on application server 144 for all requests already made. These requests are allowed to be processed by application server 144, while the system is prevented from adding new requests to application server 144. As the existing requests are processed and terminated, the application server becomes idle, gradually finishing all pending tasks/work. The application server may then be removed from service within instance 140, and made inaccessible or invisible to both internal requests 152, as well as client 160. In one embodiment, a change of status to any application server may prompt a change in list 146 or other lists made or maintained at instance 140 and/or central server 110. For example, the status of the application can be monitored by a Monitor Bean in a Java system (Java is available from Sun Microsystems of Santa Clara, Calif.). Note that all trademarks used herein are the property of their respective owners, and are used herein solely for purposes of identifying the source of particular products.

While distributed system 100 and its components are described with certain details in reference to FIG. 1, it will be understood that in general, an application server is made inactive or isolated based on a status indicator, flag, identifier, etc., associated with the application server. In one specific example, consider a debug kernel in a system landscape that runs on optimized kernels. With isolated application servers, an error analysis can be made much simpler than in traditional systems. Besides the error analysis scenario, isolating application servers enables a soft shutdown (automated fade-out) of an application server. In one embodiment, an isolated application server is for temporary use only. The application server can be strictly isolated to prevent users or queued data to be directed to the application server. Isolation of the application server can prevent data loss within the system. In one embodiment, an application server having an isolated state is excluded from all existing load balancing methods (e.g., RFC and GUI (graphical user interface) groups).

In one embodiment, an isolated application server enables start/fade-out of an application server without the need for additional components, and with minimal configuration. The application server is may be only visible for example, for administrative tasks (such as SM51 within an SAP system), but not for business applications. As mentioned previously, upgrades within an instance or a system may be performed by installing changes to one or more isolated application servers (the number to be isolated at a time is dependent on the system). In such a way, for example, a rolling kernel switch may be implemented in the system, where the kernel upgrade is performed on application servers as they are isolated, and the application servers are removed from availability for maintenance, and are then returned to normal service.

In one embodiment, application servers become automatically visible within a system upon setup or initiation of the application server. In particular, the application server may be visible, for example, to load balancing methods in the system. When the system sees the application server, it will typically begin sending requests to it for processing. With application server isolation as described herein, the application server will be available for only internal requests that are desired to be run on the application server, or no requests will be run on the application server. With an isolated application server, requests from resources such as HTTP, RFC, updates, batch creation, etc., are blocked from accessing the isolated application server, because these resources rely on the list of application servers that can be used within the system. If the application server is not present on the list, it is not available to these resources.

While the applications or client applications are shown within the instance in which the isolated server exists, in one embodiment, central server 110 executes one or more applications that generate requests for isolated application server 144, assuming the applications have the proper rights to make such requests. Assuming the applications do not have such rights, the applications may not be able to access isolated application server 144, which may remain invisible to the applications.

Figure 2:
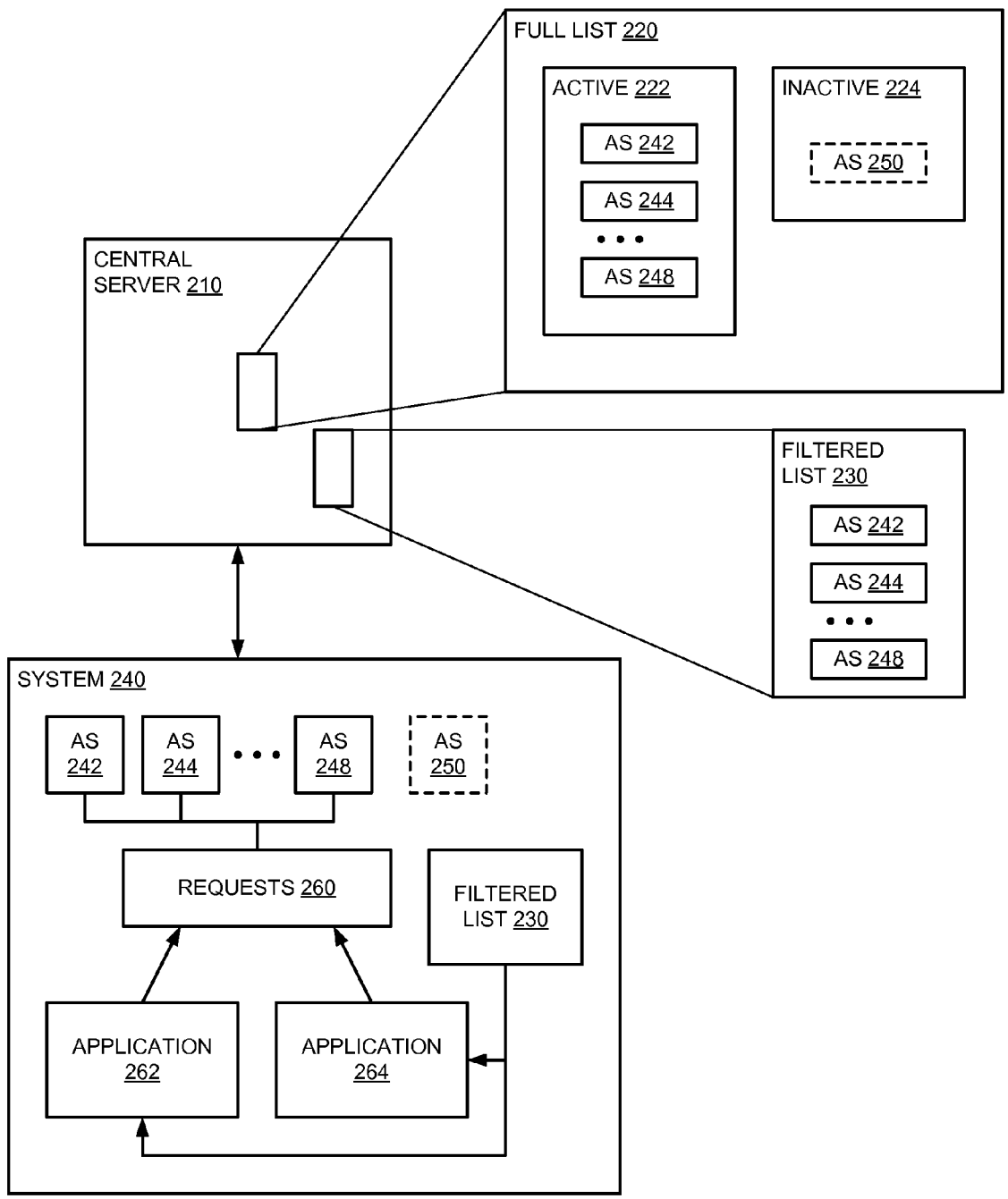
FIG. 2 is a block diagram of an embodiment of a distributed system having an application server availability lists that exclude an isolated application server.

FIG. 2 is a block diagram of an embodiment of a distributed system having an application server availability lists that exclude an isolated application server. System 200 is an example of a distributed system in accordance with any embodiment described herein. Central server 210 is a central server that provides services to the distributed system. Distributed system 200 includes various subsystems or system, such as system 240, which perform operations and service requests within distributed system 200.

In one embodiment, central server 210 includes full list 220, which represents a list of application servers within system 240, and filtered list 230, which also represents a list of application servers within system 240. Full list 220 includes active application servers 222, which lists AS (application server(s)) 242 through 248. Full list 220 also includes inactive application servers 224, which lists AS 250.

Within system 240, AS 242-248 are available to process requests 260 from applications 262 and 264. AS 250 is isolated from servicing the requests, instead performing the work, for example of a specific application or process designed to perform a specific work on the isolated application server while the application server is isolated, or due to the isolation of the application server.

In one embodiment, when an application within distributed system 200 (whether internal or external) requests resources within a system, the application receives the reduced list, filtered list 230, which does not include isolated AS 250. List 230 is passed to applications 262 and 264, which are then limited to accessing the application server of which they are aware, which includes AS 242-248, and specifically excludes AS 250.

Figure 3:
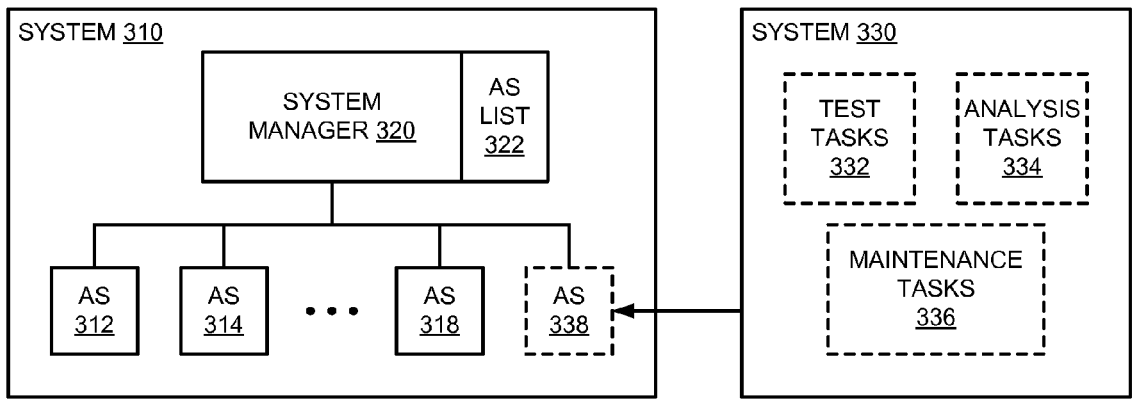
FIG. 3 is a block diagram of an embodiment of a distributed system having an isolated application server for system testing.

FIG. 3 is a block diagram of an embodiment of a distributed system having an isolated application server for system testing. System 300 and its components represent examples of a distributed system and its components in accordance with any embodiment described herein. Specifically, distributed system 300 is shown having system 310, which includes system manager 320, AS list 322, and application servers AS 312 through 318 and 338. System manager 320 represents components that allow system 310 to determine a state of each application server within system 310, as well as potentially dynamically changing the state of one or more application servers. Additionally, in one embodiment, system manager 320 enables system 310 to generate and/or maintain (e.g., update) AS list 322. AS list 322 represents a full list and/or a filtered list of application servers. It will be appreciated that a filtered list is passed to applications requesting services of system 310.

In one embodiment, distributed system 300 includes system 330, which represents a system to execute any one of many possible tests or maintenance operations with respect to system 310. Test system 330 may include any one or more of test tasks 332, analysis tasks 334, or maintenance tasks 336. Test tasks 332 may include any type of operation that may be requested to test the functioning of system 310. Analysis tasks 334 may also test the functioning of system 310, specifically monitoring for performance parameters or performance expectations. Maintenance tasks 336 may include, for example, system upgrades or server switching, as described in more detail below with respect to FIG. 4. Additional scenarios may also be employed, such as the use of a soft shutdown.

In a maintenance mode, such as a kernel upgrade, where AS 338 may be provided with a different kernel or different configuration parameters and executed within system 310 to test the new configuration. In one embodiment, a virtualization scenario allows load- and/or time-based changing of the number of application servers that are available. Time-based changes may depend, for example, on historical data or observed conditions that indicate how much demand is expected at certain times of days, or even on certain days (e.g., weekends versus weekdays). Load-based demand may be related to the concepts of time-dependent demand, or could be separate. Load-based demand refers generally to how many requests are on a system at a given time.

In one embodiment, a soft shut down is achieved by selectively deactivating or shutting down one or more application servers (e.g., AS 338). Consider that work could be transferred from AS 338, and the system could wait for all current tasks to finish before removing the application server. The transfer and wait to allow all tasks to finish before removing the application helps ensure that nothing in the system is lost, disrupted, or "broken" in any way while allowing the option to shut down an active application server (e.g., shutting down an application server that is not adequately utilized, or not utilized more than a threshold level, such as a number of requests within a given time).

In one embodiment, a kernel update test is implemented in system 310 by use of isolated application servers. In one embodiment, it may be possible to update the kernel by isolating and updating the kernel of application servers either individually or in groups, and then re-introducing the application servers. However, for purposes of discussion here, the use case of introducing an isolated application server for testing is more explicitly described. A user (e.g., an administrative user or developer) may access system 310 through a user interface connected to the system. The user can generate a new application server (e.g., AS 338) within system 310, and assign a state of inactive to the application server. New application server 338 can be developed with a new kernel. In the case of changing an existing application server (e.g., AS 312 through 318), the user may directly address one of the application servers and change its state from active to inactive, as well as modifying the kernel to an updated version. For an existing application server where the kernel may simply be changed, the user could then change the state of the application server back to active, which could be indicated proactively to a message server or system manager 320 (causing the application to be added to the active list), or could be passively discovered in an application server state discovery routine. The application server may then be placed back on a reduced list that indicates available application server in the system. In the case of testing a new kernel in AS 338, the inactive application server is isolated from requests either internal or external to system 310. A test application, however, could be configured directly with the address of the inactive, isolated application server 338, allowing it to send internal requests to the inactive application server. When all tests are completed, application server 338 can be removed from the system. When application server 338 is added to the system, it is placed on a "full" list of application servers, but is excluded from a reduced list that indicates what servers are available in system 310. When application server 338 is removed from the system, the full list is updated to remove the application server.

Figure 4:
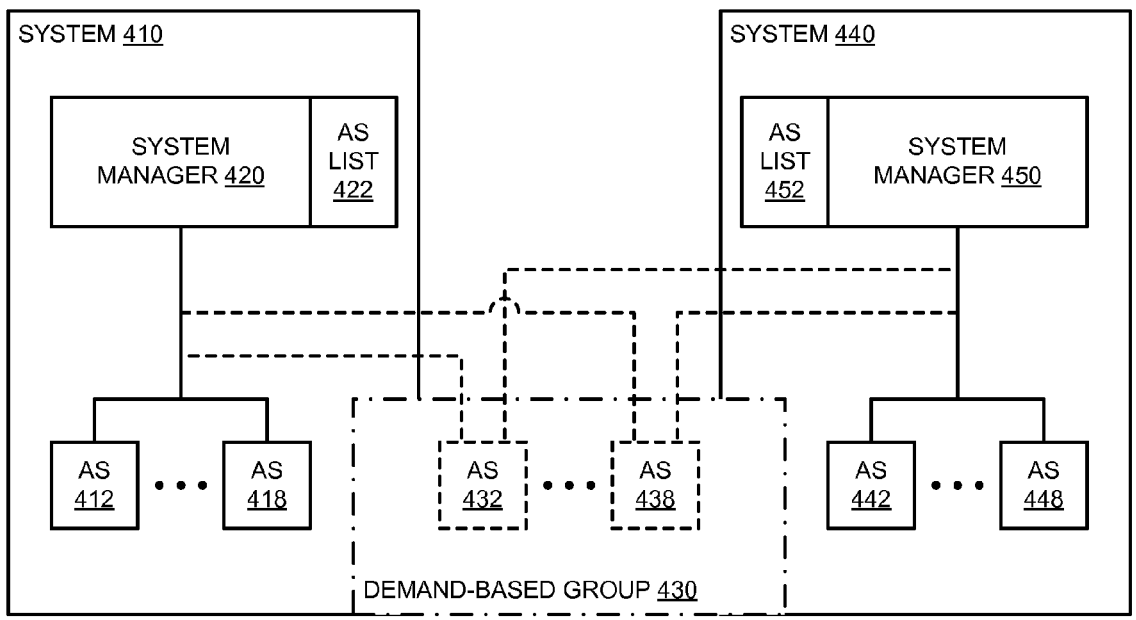
FIG. 4 is a block diagram of an embodiment of a distributed system having isolated application servers that are selectively available for one or more systems.

FIG. 4 is a block diagram of an embodiment of a distributed system having isolated application servers that are selectively available for one or more systems. System 400 and its components represent examples of a distributed system and its components in accordance with any embodiment described herein. Distributed system 400 is similar to distributed system 300 of FIG. 3. Distributed system 400 includes two subsystems, systems 410 and 440. Each includes a system manager, 420 and 450, respectively, to manage the use of application servers within the systems. System 410 includes AS list 422, which is a list presented to applications within system 410 to indicate what application servers are available from which the application servers can make resource requests. System 440 similarly includes AS list 452, which indicates the available (e.g., non-isolated, or non-inactive) application servers in system 440.

Distributed system 400 specifically illustrates an example of how one or more application servers can be switched between systems. In a single-system scenario, such as illustrated in FIG. 3, an application server may simply be active or inactive with respect to the system. In distributed system 400, however, the systems can coordinate the activation and deactivation of one or more application servers, in this case demand-based application servers AS 432 through 438. System 410 generally includes application servers AS 412-418. When demand is high, one or more of demand-based application server 432-438 may be selectively activated within system 410. Each application server may include a potential connection to system 410, which could be activated by the application server accessing system manager 420, or being accessed by system manager 420 (e.g., via an administrative instruction). One or more application servers of group 430 may then be added to AS list 422, to make them available to applications making requests within system 410.

Similar activity could take place in system 440. The systems could thus share application server group 430 as an application server pool. However, there is also a complementary activity that could occur, where an application server from group 430 may be active in system 410, for example, and then be deactivated in system 410 and concurrently (either simultaneously, or closely sequentially) activated in system 440 (e.g., by placing it on AS list 452). The sharing of the application servers may be coordinated by having one of the systems control the use of the application servers. For example, one or both systems 410 and 440 may include business logic that can evaluate relative need between the two systems and determine or calculate (e.g., algorithmically through a heuristic or a need-calculation) which system should currently use an application server. Alternatively, one system may have priority, and could control the application servers of demand-based group 430, except where demand lessens, in which case they application servers could be switched over to the other system.

It will be understood that reference with respect to FIG. 4 to activating and deactivating an application server in one system may be performed similarly to what is described above (for example, with respect to FIG. 1). Briefly, each application server in demand-based application server group 430 may initially be brought up in either system 410 or system 440 as an active, or as an isolated application server. The initialization of each application server can be implementation specific based on how the overall system is configured. In one embodiment, when the application servers of group 430 access a message server, they are added both to AS list 422 of system 410 and AS list 452 of system 440. The application servers may be initially listed as inactive on one or both of the systems. A coordination module may execute within a central services server, or may execute locally to one or both of systems 410 and 440. The coordination module can coordinate which system issues an administrative command (or may issue the administrative commands itself) to activate an application server for a particular system.

Thus, each application server of group 430 is typically active in one system or the other, or in neither system. Although it may be possible for an application server to be active for both systems, that may not be desirable for the system configuration. Thus, assuming an implementation where an application server is active for none or one system, each application server may be active on one application server list (e.g., AS list 422 or AS list 452, assuming these lists represent the reduced or filtered list), and inactive on the other list (or inactive on both lists). Consider that application server 432 is active on its reduced list (e.g., AS list 422). System 410 indicates its list including application server 432 as available for servicing requests within system 410. At that time, application server 432 may be excluded from its reduced list (e.g., AS list 452), with which system 440 indicates its available application servers. Thus, application server 432 may receive requests from system 410, but not from system 440. In the case where demand shifts to cause application server 432 to be moved from system 410 to system 440, application server 432 would be excluded from its reduced list, and specifically included on the reduced list of system 440. Thus, application server 432 would be isolated from system 410 requests, and active in system 440.

Figure 5:
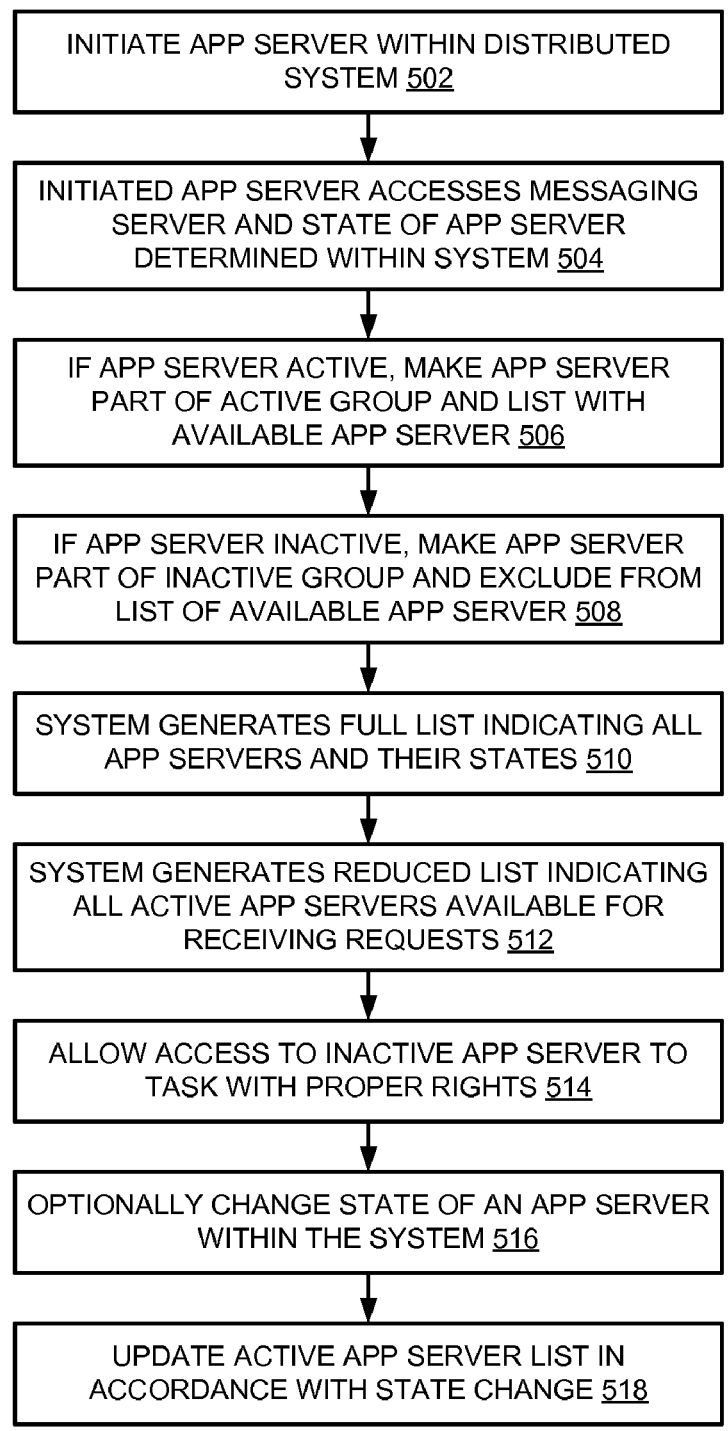
FIG. 5 represents a flow diagram of an embodiment of managing a system having an isolated application server.

FIG. 5 represents a flow diagram of an embodiment of managing a system having an isolated application server. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

An application server is initiated in a subsystem of a distributed system, 502. In one embodiment, upon initialization the application server accesses a messaging server within the distributed system to indicate state of the application server, 504. Alternatively, the state of the application server can be otherwise determined, such as by polling or requesting the state.

If the state of the application server is determined to be active, the application server is made part of an active group, and is listed with available application servers, 506. If the state of the application server is determined to be inactive, the application server is made part of an inactive group, and is excluded from the list of available servers, 508. The system generates a full list of application servers that indicates the application servers and their state, 510. The system also generates a reduced list of application servers that are available for receiving and processing requests, 512.

When an application posts a request, the load balancer of the system may put it to the application servers, or could get a list (i.e., the reduced list, or the filtered list such as filtered list 230 of FIG. 2) and get to one application server and get the address to the application server to enable performing a local request on the application server. The applications can only address the application servers that are known from the reduced list. However, administrative tasks or tasks with appropriate rights can get the full list and obtain access to all the application servers, including the inactive application servers, 514. Access to the inactive application servers can allow the performance of testing, maintenance, or analysis on the system without disrupting the system, and without disrupting the testing or analysis by client requests.

In one embodiment, optionally the system dynamically changes the state of an application server within the system, either deactivating an active application server, or activating a deactivated application server, 516. The full list is updated in accordance with the change of state, 518. Additionally, the reduced list can be updated in accordance with the change of state, 518. The state of the application server can be changed for any of a variety of reasons, such as the use cases discussed above.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method in a distributed system of servers that share a workload comprising:
   determining at a central server of the distributed system a state of application servers in the distributed system;
   generating a filtered list of application servers in a subsystem of the distributed system, which includes all active application servers that are available to service requests within the subsystem, and which excludes application servers in an inactive mode, to prevent requests to application servers in the inactive mode, where an application server in the inactive mode is unavailable for load balancing of the shared workload, but is available for direct access to execute a task in a context of the distributed system without executing tasks of the shared workload; and
   passing the filtered list of application servers to a client application in response to a request by the client application for resources, to provide access only to the active application servers to the client application for resource requests.

2. The method of claim 1, wherein determining the state of the application servers further comprises:
   receiving an indication from an application server upon initiation of each application server whether the application server is active or inactive.

3. The method of claim 1, wherein passing the filtered list of application servers to the client application comprises:
   passing the filtered list to the subsystem, which presents the list to applications within the subsystem.

4. The method of claim 1, further comprising:
   applying testing data requests to the application server in inactive mode to test the functionality of the subsystem in the context of the subsystem.

5. The method of claim 4, further comprising:
   applying kernel changes to the application server in inactive mode.

6. The method of claim 1, further comprising:
   changing a state of a selected active application server to inactive, allowing the selected application server to terminate processing on current tasks, while not allowing new requests to be made of the application server within the subsystem.

7. The method of claim 6, further comprising:
   changing the state of the selected application server on a timed-basis to vary a number of active application servers at different times of day.

8. The method of claim 6, further comprising:
   changing the state of the selected application server on a demand-basis.

9. The method of claim 6, wherein the application server is part of the subsystem, and part of a different subsystem, and further comprising:
   changing the state of the selected application server on a timed-basis or a demand-basis to vary a number of application servers between the subsystems.

10. The method of claim 1, further comprising:
    generating a full list of application servers in a subsystem of the distributed system, including an indication of the state of each application server within the subsystem.

11. A computer readable storage medium having instructions stored thereon that provides instructions to cause a processor to perform operations including:
    determining at a central server of a distributed system of servers that share a workload a state of application servers in the distributed system;
    generating a full list of application servers in a subsystem of the distributed system, including an indication of the state of each application server within the subsystem;
    generating a filtered list of application servers in the subsystem, which includes all active application servers that are available to service requests within the subsystem, and which excludes application servers in an inactive mode, to prevent requests to application servers in the inactive mode, where an application server in the inactive mode is unavailable for load balancing of the shared workload, but is available for direct access to execute a task in a context of the distributed system without executing tasks of the shared workload; and
    passing the filtered list of application servers to a client application in response to a request by the client application for resources, to provide access only to the active application servers to the client application for resource requests.

12. The computer readable medium of claim 11, further comprising instructions to cause the processor to perform operations including:
    applying testing data requests to the application server in inactive mode to test the functionality of the subsystem in the context of the subsystem.

13. The computer readable medium of claim 11, further comprising instructions to cause the processor to perform operations including:
    applying kernel changes to the application server in inactive mode.

14. The computer readable medium of claim 11, further comprising instructions to cause the processor to perform operations including:
    changing a state of a selected active application server to inactive, allowing the selected application server to terminate processing on current tasks, while not allowing new requests to be made of the application server within the subsystem.

15. The computer readable medium of claim 11, further comprising instructions to cause the processor to perform operations including:
    changing the state of the selected application server on a timed-basis or a demand-basis.

16. A system comprising:
    a data storage device to store an application server availability list, the application server availability list to indicate a filtered list of application servers in a subsystem of a distributed system of servers that share a workload, the filtered list including all active application servers that are available to service requests within the subsystem, and excluding application servers in an inactive mode, to prevent requests to application servers in the inactive mode, where an application server in the inactive mode is unavailable for load balancing of the shared workload, but is available for direct access to execute a task in a context of the distributed system without executing tasks of the shared workload; and
    a system manager to manage the use of application servers within the subsystem, including determining a state of application servers in the distributed system, generating the application server availability list, and passing the filtered list of application servers to a client application in response to a request by the client application for resources, to provide access only to the active application servers to the client application for resource requests.

17. The system of claim 16, wherein the system manager further dynamically changes a state of a selected active application server to inactive, allowing the selected application server to terminate processing on current tasks, while not allowing new requests to be made of the application server within the subsystem.

18. The system of claim 16, wherein the system manager further applies testing data requests to the application server in inactive mode to test the functionality of the subsystem in the context of the subsystem.

19. The system of claim 16, wherein the system manager further applies kernel changes to the application server in the inactive mode.

* * * * *